US 11,156,777 B2

(12) United States Patent
Baier et al.

(10) Patent No.: US 11,156,777 B2
(45) Date of Patent: Oct. 26, 2021

(54) METHOD FOR PRODUCING A POLARIZATION CONVERTER, POLARIZATION CONVERTER AND POLARIZATION CONVERTER ELEMENT

(71) Applicant: FRAUNHOFER-GESELLSCHAFT ZUR FÖRDERUNG DER ANGEWANDTEN FORSCHUNG E.V., Munich (DE)

(72) Inventors: Moritz Baier, Berlin (DE); Francisco Soares, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 27 days.

(21) Appl. No.: 15/999,749

(22) PCT Filed: Feb. 17, 2017

(86) PCT No.: PCT/EP2017/053660
§ 371 (c)(1),
(2) Date: Aug. 20, 2018

(87) PCT Pub. No.: WO2017/140871
PCT Pub. Date: Aug. 24, 2017

(65) Prior Publication Data
US 2019/0154917 A1 May 23, 2019

(30) Foreign Application Priority Data
Feb. 19, 2016 (DE) ...................... 10 2016 202 634.8

(51) Int. Cl.
*G02B 6/126* (2006.01)
*G02B 6/14* (2006.01)
(Continued)

(52) U.S. Cl.
CPC ............... *G02B 6/126* (2013.01); *G02B 6/13* (2013.01); *G02B 6/14* (2013.01); *G02B 6/2766* (2013.01); *G02B 6/105* (2013.01)

(58) Field of Classification Search
CPC combination set(s) only.
See application file for complete search history.

(56) References Cited

U.S. PATENT DOCUMENTS 2,540,839 A * 2/1951 Southworth .............. H01P 5/12
343/778
4,868,897 A 9/1989 Von Helmolt
(Continued)

FOREIGN PATENT DOCUMENTS

DE 102009013878 B3 5/2010
EP 277503 A2 8/1988
(Continued)

OTHER PUBLICATIONS

J. Pello, et al., "Design of a new ultra-small polarization converter in InGaAsP/InP membrane", Jan. 2010 (Year: 2010).*
(Continued)

*Primary Examiner* — Christopher Stanford
(74) *Attorney, Agent, or Firm* — Maschoff Brennan

(57) ABSTRACT

It is provided a method for producing a polarization converter The method comprising the following steps: producing a first converter element which has a base side, an upper side extending parallel to the base side, and a longitudinal side oriented obliquely at an angle $\varepsilon_1$ to the base side or a curved longitudinal side; producing a second converter element which has a base side, an upper side extending parallel to the base side, and a longitudinal side oriented obliquely at an angle $\varepsilon_2$ to the base side or a curved longitudinal side; arranging the first and the second converter element in series in such a way that the obliquely (Continued)

oriented or curved longitudinal sides point in opposite directions.

16 Claims, 2 Drawing Sheets

(51) Int. Cl.
*G02B 6/27* (2006.01)
*G02B 6/13* (2006.01)
*G02B 6/10* (2006.01)

(56) References Cited

U.S. PATENT DOCUMENTS

| | | | | |
|---|---|---|---|---|
| 5,243,669 | A * | 9/1993 | Alferness | G02B 6/126 359/489.06 |
| 5,539,845 | A * | 7/1996 | van der Tol | G02B 6/126 216/24 |
| 5,703,977 | A * | 12/1997 | Pedersen | G02B 6/126 385/28 |
| 5,832,146 | A * | 11/1998 | Bruno | G02B 6/12011 385/11 |
| 7,609,915 | B2 * | 10/2009 | Shvets | G02B 6/4208 385/11 |
| 8,094,978 | B2 * | 1/2012 | Tokushima | G02B 6/1228 385/11 |
| 8,787,129 | B1 * | 7/2014 | Jin | G02B 6/105 369/13.13 |
| 8,854,931 | B2 * | 10/2014 | Komura | H01P 1/165 369/13.13 |
| 8,873,354 | B2 * | 10/2014 | Jin | G02B 6/105 369/13.13 |
| 8,885,449 | B2 * | 11/2014 | Jin | G02B 6/105 29/603.07 |
| 9,075,197 | B2 * | 7/2015 | Van der Tol | G02B 6/2766 |
| 9,529,151 | B2 * | 12/2016 | Goi | G02B 6/126 |
| 2003/0174956 | A1 * | 9/2003 | Viens | G02B 6/1228 385/43 |
| 2004/0240822 | A1 * | 12/2004 | Patel | G02F 1/025 385/130 |
| 2005/0095741 | A1 * | 5/2005 | Johnstone | G02B 6/1228 438/31 |
| 2006/0018584 | A1 * | 1/2006 | Watts | G02B 6/126 385/11 |
| 2007/0279739 | A1 | 12/2007 | You et al. | |
| 2008/0147759 | A1 * | 6/2008 | Fiorentino | B82Y 10/00 708/250 |
| 2010/0002989 | A1 | 1/2010 | Tokushima | |
| 2011/0170825 | A1 * | 7/2011 | Spector | G02B 6/1228 385/43 |
| 2012/0057173 | A1 | 3/2012 | Heidrich et al. | |

FOREIGN PATENT DOCUMENTS

| | | | |
|---|---|---|---|
| EP | 0 645 650 | A1 | 3/1995 |
| JP | 10078521 | A * | 3/1998 |
| JP | H1078521 | A | 3/1998 |
| JP | 10111423 | A * | 4/1998 |
| WO | 97/11396 | A1 | 3/1997 |
| WO | 2013/83493 | A1 | 6/2013 |
| WO | 2017/140871 | A2 | 8/2017 |

OTHER PUBLICATIONS

M. Felicetti, et al., "Integrated High-Performance TE/TM Converters for Polarization Independence in Semiconductor Optical Amplifiers", Sep. 2015 (Year: 2015).*

J. Pello, et al., "High-efficiency ultrasmall polarization converter in InP membrane", Sep. 2012 (Year: 2012).*

Calvo et al., "Optical Waveguides: From Theory to Applied Technologies", CRC Press, Jan. 19, 2007.

Dzibrou, D. O., "Building blocks for control of polarization in photonic integrated circuits", Dissertations, Eindhoven, Feb. 18, 2014.

Dzibrou, D. O., "Improved fabrication process of low-loss and efficient polarization converters in InP-based photonic integrated circuits", Optics Letters, vol. 38, No. 7, pp. 1061-1063, Apr. 2013.

El-Refaei, H. et al., "Slanted-Rib Waveguide InGaAsP—InP Polarization Converters", Journal of Lightwave Technology, Vo. 22, No. 5, pp. 1352-1357, May 2004.

Baier, M., et al., "Highly Fabrication Tolerant Polarization Converter for Generic Photonic Integration Technology," Compound Semiconductor Week, 28th International Conference on Indium Phosphide & Related Materials (IPRM) & 43rd International Symposium on Compound Semiconductors (ISCS), pp. 1-2 (2016).

Deng, H., "Design Rules for Slanted-Angle Polarization Rotators," Journal of Lightwave Technology, vol. 23, No. 1, pp. 432-445 (Jan. 2005).

Tol, J.J.G.M., et al., "Increasing Tolerance in Passive Integrated Optical Polarization Converters," Journal of Lightwave Technology, vol. 30, No. 17, pp. 2884-2889 (Sep. 1, 2012).

Tzolov, V.P. and Fontaine, M., "A passive polarization converter free of longitudinally-periodic structure," Optics Communications, vol. 127, pp. 7-13 (Jun. 1, 1996).

* cited by examiner

METHOD FOR PRODUCING A POLARIZATION CONVERTER, POLARIZATION CONVERTER AND POLARIZATION CONVERTER ELEMENT

CROSS-REFERENCE TO A RELATED APPLICATION

This application is a National Phase patent application of International Patent Application Number PCT/EP2017/053660, filed on Feb. 17, 2017, which claims priority of German Patent Application 10 2016 202 634.8, filed on Feb. 19, 2016.

BACKGROUND

This invention relates to a method for producing a polarization converter, a polarization converter and a polarization converter element.

Polarization converters are needed for example in the field of integrated optics (for example for photonic circuits) in order to be able to check and in particular change the polarization state (in particular the polarization plane) of a light wave. What is known for example are polarization converters which include a waveguide with a longitudinal side inclined with respect to a base side and an upper side. When producing such polarization converters, however, it is required to meet quite close tolerances in order to implement an efficient polarization conversion. In a one-part polarization converter, for example, the production of the upper side of the polarization converter must be effected with a tolerance of less than 50 nm in order to obtain a conversion efficiency of at least 95%. Slightly more generous tolerances become possible by using two polarization elements (converter elements) arranged in series and mirror-symmetrically to each other; cf. for example WO 2013/083493 A1. However, even with this concept tolerance requirements are to be met, which preclude a mass production of such polarization converters.

SUMMARY

The problem underlying the invention consists in providing for a production of a polarization converter with the greatest possible tolerances.

This problem is solved by creating the method with features as described herein, by providing the polarization converter with features as described herein and the polarization converter element with features as described herein.

Accordingly, there is provided a method for producing a polarization converter, comprising the following steps:
producing a first converter element which has a base side, an upper side extending parallel to the base side, and a longitudinal side oriented obliquely at an angle $\varepsilon_1$ to the base side or a curved longitudinal side;
producing a second converter element which has a base side, an upper side extending parallel to the base side, and a longitudinal side oriented obliquely at an angle $\varepsilon_2$ to the base side or a curved longitudinal side;
arranging the first and the second converter element in series in such a way that the obliquely oriented or curved longitudinal sides point in opposite directions, wherein
the first converter element has a length $L_1$ and its upper side has a width $w_1$ measured perpendicular to the longitudinal direction of the first converter element; and the second converter element has a length $L_2$ and its upper side has a width $w_2$ measured perpendicular to the longitudinal direction of the second converter element, and wherein
the production of the first and the second converter element comprises a determination of such different lengths $L_1$ and $L_2$ and different widths $w_1$ and $w_2$ and/or different angles $\varepsilon_1$ and $\varepsilon_2$ that after passing through the first and the second converter element, a light wave polarized initially parallel to the base sides of the converter elements is polarized perpendicular to the base sides of the converter elements.

According to the method of the invention, not only the lengths $L_1$ and $L_2$, but also the widths $w_1$ and $w_2$ and/or the angles $\varepsilon_1$ and $\varepsilon_2$ are varied for dimensioning the converter elements, wherein the two converter elements very well have different widths $w_1$ and $w_2$ and angles $\varepsilon_1$ and $\varepsilon_2$, i.e. the converter elements have different cross-sections (oriented not only mirror-symmetrically to each other).

This means in particular that none of the modes propagating in the first and the second converter element has a polarization that forms an angle of 45° with the respective base side of the converter element (i.e. with the horizontal). In particular, the widths $w_1$ and $w_2$ and/or the angles $\varepsilon_1$ and $\varepsilon_2$ are chosen such that the polarization planes of the modes propagating in the first and the second converter element include different angles with the respective base sides (i.e. with the horizontal). In other words, the invention provides for a design of the first and the second converter element which does not require that the angles at which the modes are polarized in the first and the second converter element are the same and amount to 45°.

Avoiding the definition of a polarization angle of 45° of the modes in the converter elements provides for distinctly greater tolerance ranges in the production of the converter elements. This can be explained by the fact that the dependence of the respective polarization angle of the modes and also of the beat length on the width $w_1$ and $w_2$ of the converter elements has relatively strong gradients at a polarization angle of 45°. Beat length $L_\pi$ refers to the length of a polarization converter element (e.g. of the first or the second converter element) at which the polarization converter element rotates an input polarization by 90°. It applies:

$$L_\pi = \frac{\lambda}{2(n_{00} - n_{01})}$$

wherein
$n_{00}, n_{01}$ designates the indices of refraction of the modes $\vec{e}_{00}$ and $\vec{e}_{01}$ propagating in the first and second converter element.

With the method according to the invention it is possible in particular to increase the tolerances in the production of the converter elements and hence of the polarization converter such that for example a production of the converter elements by contact lithography is possible. For example, tolerances of more than 250 nm can be acceptable in order to achieve a conversion efficiency above 95%.

According to one aspect of the invention the determination of the different lengths $L_1$ and $L_2$ and different widths $w_1$ and $w_2$ and/or the different angles $\varepsilon_1$ and $\varepsilon_2$ is effected by using a numerical optimization method with the quantities $L_1$, $L_2$ as well as $w_1$, $w_2$ and/or $\varepsilon_1$, $\varepsilon_2$ as variable parameters.

For carrying out the optimization method for example an error function (target function) is determined, and by means of the optimization method at least one zero point of the target function is determined. For example, for determining the target function the arrangement comprising the first and the second converter element is described by a Jones matrix J, wherein the light wave $\vec{E}_{out}$ exiting from the second converter element is obtained via the Jones vector J from the light wave $\vec{E}_{TE}$ entering into the first converter element, wherein $$\vec{E}_{out} = J\vec{E}_{TE}$$

$$\vec{E}_{TE} = \begin{pmatrix} 1 \\ 0 \end{pmatrix}$$

The optimization method now can serve to determine values of the lengths $L_1$, $L_2$, of the widths $w_1$, $w_2$ and/or of the angles $\varepsilon_1$, $\varepsilon_2$ such that the elements on the main diagonal of J disappear. Thus, for example the x-component of light $\vec{E}_{out}$ exiting from the second converter element is zero.

For example, by using an analytical model for the arrangement comprising the first and the second converter element (i.e. for the Jones vector) the following is obtained for $\vec{E}_{out}$:

$$E_{out} = \begin{bmatrix} ((e^{2i\pi\delta_1}\sin^2(\alpha_1) + \cos^2(\alpha_1))(e^{2i\pi\delta_2}\sin^2(\alpha_2) + \cos^2(\alpha_2)) + \\ \frac{1}{8}(e^{2i\pi\delta_1} - 1)(e^{2i\pi\delta_2} - 1)(\cos(2\alpha_1 - 2\alpha_2) - \cos(2\alpha_1 + 2\alpha_2)))e^{i\pi(-\delta_1 - \delta_2)} \\ ((e^{2i\pi\delta_1}\sin^2(\alpha_1) + \cos^2(\alpha_1))(-e^{2i\pi\delta_2} + 1)\sin(\alpha_2)\cos(\alpha_2) + \\ (e^{2i\pi\delta_2}\cos^2(\alpha_2) + \sin^2(\alpha_2))(-e^{2i\pi\delta_1} + 1)\sin(\alpha_1)\cos(\alpha_1)) \\ e^{-i\pi(\delta_1 + \delta_2)} \end{bmatrix}$$

In which $$\delta_{1,2} = \frac{\Delta n L_{1,2}}{\lambda}$$

and $$\alpha_{1,2} = \alpha_{1,2}(w_{1,2})$$

wherein
$\Delta n$ is the difference of the indices of refraction of the modes $\vec{e}_{00}$ and $\vec{e}_{01}$ each propagating in the first and the second converter element and polarized perpendicular to each other, and wherein $\alpha_1$ designates the angle at which the first mode $\vec{e}_{00}$ propagating in the first converter element is polarized with respect to the horizontal (the base side of the converter element). Analogously, $\alpha_2$ designates the polarization angle of the mode $\vec{e}_{00}$ propagating in the second converter element.

A zero point for the x-component of $\vec{E}_{out}$ is obtained for $\alpha_1=\alpha_2=45°$, $\delta_1=0.25$, $\delta_2=-0.75$.

However, further zero points exist for $\alpha_1 \neq \alpha_2$, which are determined by means of the above-mentioned numerical optimization method by variation of $L_1$, $L_2$ and $w_1$, $w_2$ and/or $\varepsilon_1$, $\varepsilon_2$.

In addition, it is conceivable that the length of the first converter element and/or the length of the second converter element is a rational fraction of the respective beat length (see above).

The longitudinal side of the first and/or the second converter element in particular extends at least substantially in a planar fashion and at the angle with the respective base side of the converter element.

It is also conceivable, however, that the longitudinal side of the first and/or the second converter element has a (concave) curvature. For example, the radius of this curvature determines the width of the converter element. It is also possible that the curved longitudinal side is produced by an etching method, wherein the etching period in particular determines the radius of the curvature.

The invention also relates to a polarization converter, comprising
a first converter element which has a base side, an upper side extending parallel to the base side, and a longitudinal side oriented obliquely at an angle $\varepsilon_1$ to the base side or a curved longitudinal side;
a second converter element which likewise has a base side, an upper side extending parallel to the base side, and a longitudinal side oriented obliquely at an angle $\varepsilon_2$ to the base side or a curved longitudinal side; wherein the first and the second converter element are arranged in series in such a way that the obliquely oriented or curved longitudinal sides point in opposite directions, wherein
the first converter element has a length $L_1$ which is different from the length $L_2$ of the second converter element, and wherein
the upper side of the first converter element has a width $w_1$ measured perpendicular to the longitudinal direction of the first converter element, which is different from the width $w_2$ of the second converter element, and/or
the longitudinal side of the first converter element forms an angle $\varepsilon_1$ with the base side of the first converter element, which is different from the angle $\varepsilon_2$ formed by the longitudinal side of the second converter element with the base side of the second converter element.

The polarization converter in particular is produced by the method described above. Correspondingly, the variants of the invention already explained above analogously can also be applied to the polarization converter according to the invention.

The first and/or the second converter element of the polarization converter according to the invention for example each have a trapezoidal cross-section.

The first and the second converter element for example is a semiconductor component. It is conceivable in particular that light is coupled into the first converter element via an optical waveguide (for example an integrated optical waveguide) and is coupled out of the second converter element via a further optical waveguide (for example via a further integrated optical waveguide). It is also conceivable that the polarization converter according to the invention includes more than two converter elements arranged in series.

It is also possible that the first and the second converter element each include a semiconductor layer arranged on a substrate, wherein an upper side of the respective substrate defines the respective base side of the converter element. For example, the widths and/or the angles are chosen as already mentioned above such that in the first and the second converter element a mode each propagates whose polarization plane forms an angle different from 45° with the respective base side of the converter element.

As likewise already mentioned above, the widths and/or the angles in particular are chosen such that the angles formed by the polarization planes of the modes propagating in the first converter element with the base side of the first converter element are different from the angles formed by the polarization planes of the modes propagating in the second converter element with the base side of the second converter element.

In addition, the lengths $L_1$ and $L_2$ need not be integer multiples of each other, i.e. neither the length $L_1$ must be an integer multiple of the length $L_2$ nor inversely the length $L_2$ must be an integer multiple of the length $L_1$.

The invention also relates to a polarization converter element with a base side, an upper side extending parallel to the base side, and a longitudinal side which has a curvature. Such a polarization converter element can form a polarization converter as an individual element. It is also conceivable, however, that it is used as a converter element in a two-part polarization converter or a polarization converter includes two such polarization converter elements, as already mentioned above.

BRIEF DESCRIPTION OF THE DRAWINGS

The invention will be explained in detail below by means of exemplary embodiments with reference to the Figures.

DETAILED DESCRIPTION

Figure 1:
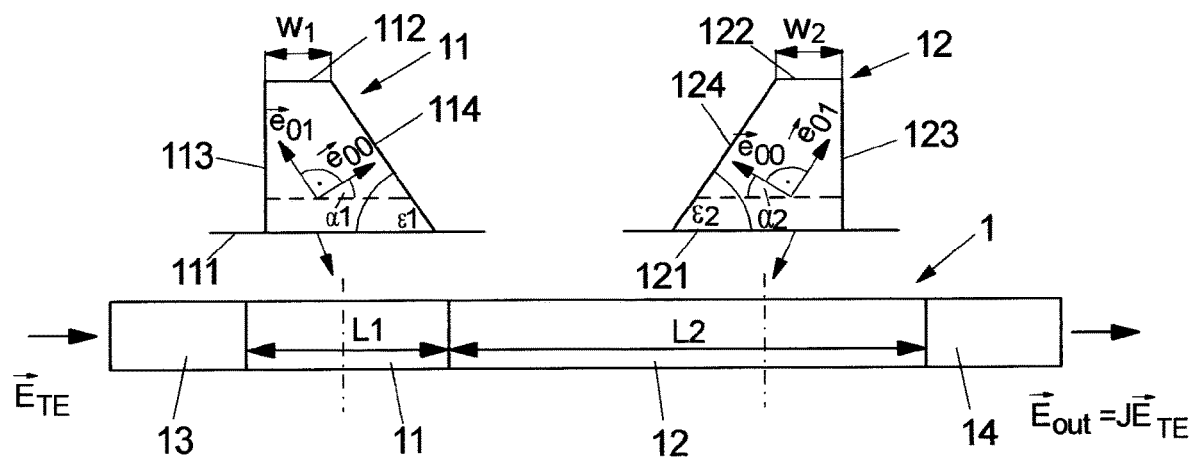
FIG. 1 schematically shows a side view of a polarization converter according to an exemplary embodiment of the invention.

The polarization converter 1 schematically shown in FIG. 1 includes a first and a second converter element 11, 12. The two converter elements 11, 12 are arranged in series (along their longitudinal axes) adjacent to each other, wherein the coupling of light into the polarization converter 1 is effected via the first converter element 11 and the outcoupling of light is effected via the second converter element 12. More exactly, the polarization converter 1 includes an input waveguide 13 via which the light is coupled into the first converter element 11 and hence into the polarization converter 1. Furthermore, a second output waveguide 14 is present, via which light can be outcoupled from the second converter element 12 and hence from the polarization converter 1. It is also possible in principle that the converter elements 11, 12 are arranged at a distance from each other.

The sectional representations also contained in FIG. 1 each show a cross-section of the first and the second converter element 11, 12. Accordingly, the first converter element 11 has a trapezoidal cross-section with a base side 111 and an upper side 112 parallel to the base side 111 with a width $w_1$. In addition, the first converter element 11 has two longitudinal sides 113, 114, of which the one (the longitudinal side 113) extends perpendicular to the base side and the upper side 111, 112. The other longitudinal side 114 is oriented obliquely, namely at an angle $\varepsilon_1$ to the base side and the upper side 111, 112. The base sides 111, 112 can be defined by surfaces (e.g. of a substrate) each protruding beyond the longitudinal sides 113, 114. The converter elements 11, 12 in particular are arranged such that their base sides 111, 112 extend at one level and parallel to each other.

The second converter element 12 likewise has a trapezoidal cross-section with a base side and an upper side 121, 122 as well as a longitudinal side 123 extending perpendicular thereto and a longitudinal side 124 oriented obliquely (at an angle $\varepsilon_2$) to the base side and the upper side 121, 122. The upper side 122 has a width $w_2$.

The first and the second converter element 11, 12 are arranged in series (along the propagation direction of the light coupled into the polarization converter 1) such that the obliquely oriented longitudinal sides 114, 124 point in opposite directions.

The converter elements 11, 12 have different lengths $L_1$, $L_2$, the length $L_1$ being less than the length $L_2$. In addition, the widths $w_1$, $w_2$ and/or the angles $\varepsilon_1$, $\varepsilon_2$, which the oblique longitudinal sides 114, 124 include with the base side 111, 121, are different.

The lengths $L_1$, $L_2$, the widths $w_1$, $w_2$ and/or the angles $\varepsilon_1$, $\varepsilon_2$ were determined by means of an optimization algorithm as explained above, so that the polarization of a light wave entering into the polarization converter 1 (i.e. into the first converter element 11) is rotated by 90° when passing through the polarization converter (i.e. through the first and the second converter element 11, 12). For example, the polarization of a light wave $\vec{E}_{TE}$ oriented parallel to the base side 111 of the first converter element 11 on entry into the first converter element 11 is rotated when passing through the polarization converter 1 such that the light wave $\vec{E}_{out}$ exiting from the second converter element 12 is oriented perpendicular to the base side 121 of the second converter element 12.

As likewise already explained above, the widths $w_1$, $w_2$ and/or the angles $\varepsilon_1$, $\varepsilon_2$ are determined such that the angles $\alpha_1$, $\alpha_2$ included by the polarization planes of the modes $\vec{e}_{00}$ each propagating in the first and the second converter element 11, 12 with the respective base side 111, 121 are different. In particular, the angles $\alpha_1$, $\alpha_2$ are greater or less than 45°.

Figure 2:
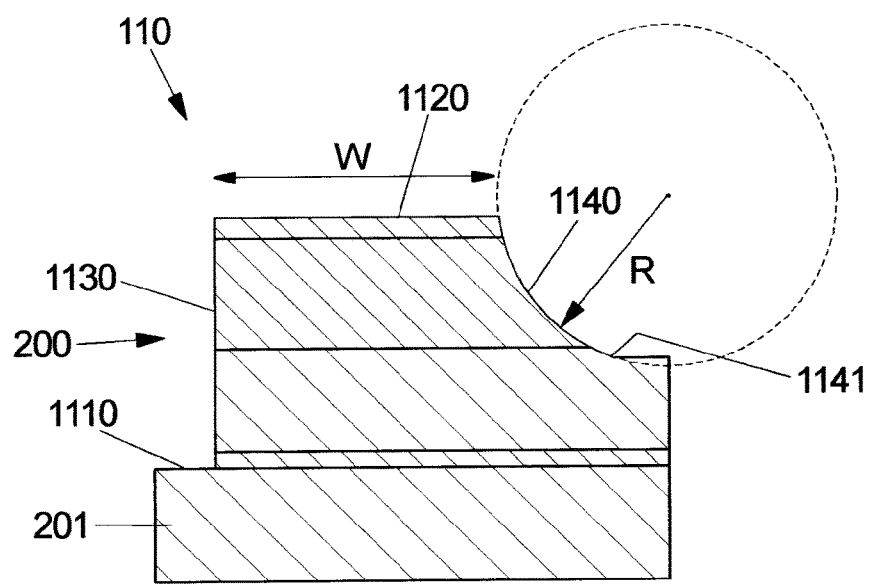
FIG. 2 shows a sectional view of a polarization converter element according to the invention.

FIG. 2 relates to a configuration of a polarization converter element 110 according to the invention, wherein FIG. 2 shows a section through the polarization converter element 110 perpendicular to its longitudinal axis. The polarization converter element 110 analogous to the converter elements of FIG. 1 has a base side 1110, an upper side 1120 parallel thereto, and a further longitudinal side 1130 which extends perpendicular to the upper side 1120 and to the base side 1110. However, the polarization converter element 110 has no purely trapezoidal cross-section.

Rather, instead of a flat longitudinal side oriented obliquely to the base side 1110 a concavely curved longitudinal side 1140 is present (with a curvature 1141). The conversion properties of the polarization converter element 110, however, likewise are determined in particular by the width w of the upper side 1120. In addition, the radius R of the curvature 1141 of the longitudinal side 1140 can influence the conversion properties. Thus, the conversion behavior of the polarization converter element 110 can also be effected via an adaptation of the radius of curvature R.

The polarization converter element 110 is formed from a plurality of semiconductor layers 200 which are arranged on a substrate 201. For example, the production of the curved longitudinal side 1140 is effected by an etching method, wherein via the duration of etching the radius R (and hence also the width w of the upper side 1120) can be set.

Figure 3:
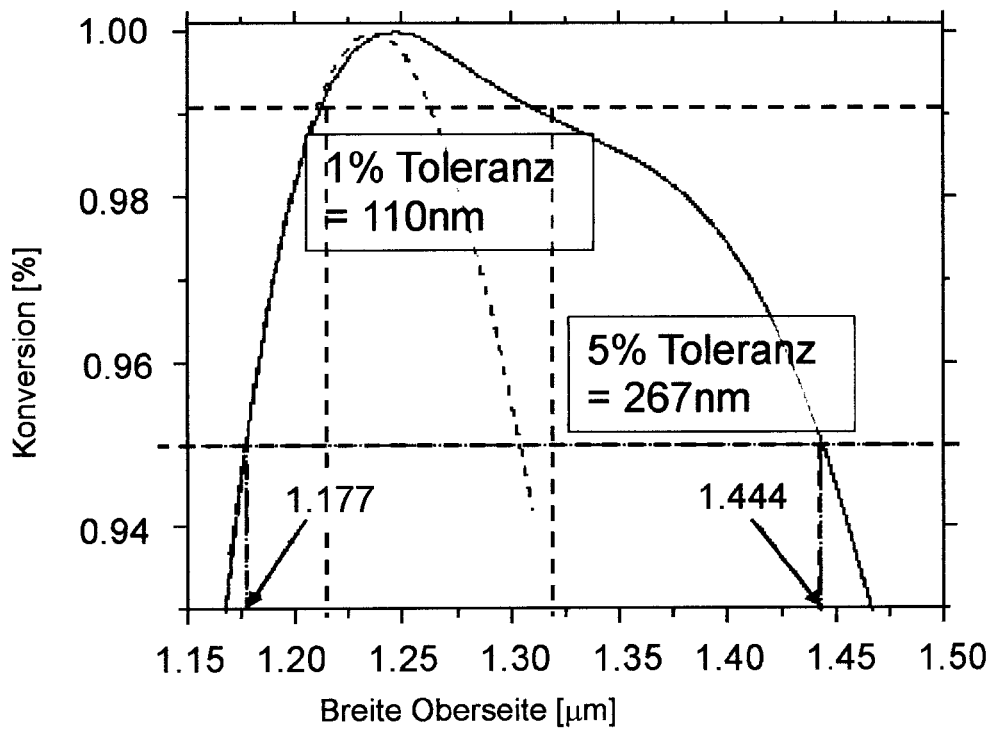
FIG. 3 shows a representation of the conversion efficiency in dependence on the width of a converter element of a conventional polarization converter.

FIG. 3 illustrates the relationship between the conversion efficiency (y-axis) and the width of the upper side of a converter element of a conventional polarization converter. What is shown here is the case of a polarization converter with only one converter element (broken line) and a polarization converter with two converter elements (continuous line). To obtain a conversion efficiency of at least 99%, i.e. 99% of the intensity of the input wave is present in an output wave with a polarization rotated by 90°, a tolerance of about 110 nm accordingly is required in the case of the polarization converter with two converter elements. For a conversion efficiency above only 95%, about 270 nm of tolerance still are required.

Figure 4:
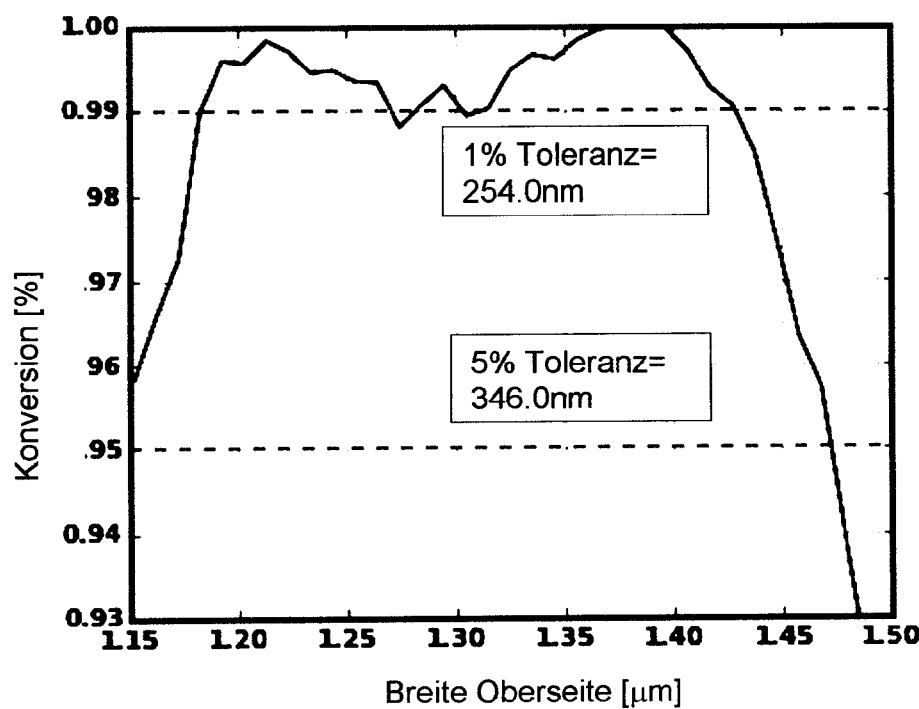
FIG. 4 shows a representation of the dependence of the conversion efficiency on the width of one of the converter elements of a polarization converter according to the invention.

FIG. 4 illustrates the dependence of the conversion efficiency on the width $w_1$ and $w_2$ of one of the converter elements of the polarization converter according to the invention. Accordingly, the tolerance requirements are distinctly lower. A conversion efficiency of 99% already is achieved with a tolerance of about 250 nm. For a conversion efficiency above 95%, a tolerance of about 350 nm even is sufficient. When using converter elements with curved longitudinal sides (FIG. 2) even greater tolerances can be achieved (e.g. 450 nm with a conversion efficiency of 99% and 530 nm with a conversion efficiency of 95%).

The invention claimed is:

1. A method for producing a polarization converter, comprising the following steps:
   producing a first converter element which has a base side, an upper side extending parallel to the base side, a first longitudinal side oriented perpendicular to the base side and the upper side and a second longitudinal side, wherein the second longitudinal side is a flat side oriented obliquely at an angle $\varepsilon_1$ to the base side or a curved side;
   producing a second converter element which has a base side, an upper side extending parallel to the base side, a first longitudinal side oriented perpendicular to the base side and the upper side and a second longitudinal side, wherein the second longitudinal side is a flat side oriented obliquely at an angle $\varepsilon_2$ to the base side or a curved side; and
   arranging the first and the second converter element in series in such a way that outward-pointing normal vectors of the first longitudinal sides of the first and the second converter element point in opposite directions, wherein:
      the first converter element has a length $L_1$ measured along a longitudinal direction of the first converter element and its upper side has a width $w_1$ measured perpendicular to the longitudinal direction of the first converter element;
      the second converter element has a length $L_2$ measured along a longitudinal direction of the second converter element and its upper side has a width $w_2$ measured perpendicular to the longitudinal direction of the second converter element, and
      the steps of producing the first and the second converter element comprise:
         determining lengths $L_1$ and $L_2$ different from one another and widths $w_1$ and $w_2$ different from one another,
         such that after passing through the first and the second converter element in a propagation direction parallel to the first and second longitudinal sides of the first and second converter element, a light wave polarized initially parallel to the base sides of the converter elements is polarized perpendicular to the base sides of the converter elements.

2. The method according to claim 1, wherein the determination of the different lengths $L_1$ and $L_2$ as well as different widths $w_1$ and $w_2$ is effected by using a numerical optimization method with the quantities L1, L2 and $w_1$, $w_2$ as variable parameters.

3. The method according to claim 2, wherein an arrangement comprising the first and the second converter element is described by a Jones matrix.

4. The method according to claim 3, wherein the components of the Jones matrix each depend on $L_1$, $L_2$ as well as $w_1$, $w_2$, wherein by means of the optimization method $L_1$, $L_2$ as well as $w_1$, $w_2$ are determined such that one of the components of a light wave exiting from the second converter element becomes zero.

5. The method according to claim 1, wherein the length $L_1$ of the first converter element or the length $L_2$ of the second converter element is a rational fraction of the respective beat length.

6. The method according to claim 1, wherein the longitudinal side of the first or the second converter element has a curvature.

7. The method according to claim 6, wherein the curved longitudinal side is produced by an etching method.

8. A polarization converter, comprising:
   a first converter element which has a base side, an upper side extending parallel to the base side, a first longitudinal side oriented perpendicular to the base side and the upper side and a second longitudinal side, wherein the second longitudinal side is a flat side oriented obliquely at an angle $\varepsilon_1$ to the base side or a curved side; and
   a second converter element which likewise has a base side, an upper side extending parallel to the base side, a first longitudinal side oriented perpendicular to the base side and the upper side and a second longitudinal side, wherein the second longitudinal side is a flat side oriented obliquely at an angle $\varepsilon_2$ to the base side or a curved side, wherein:
      the first and the second converter element are arranged in series such that outward-pointing normal vectors of the first longitudinal sides of the first and the second converter element point in opposite directions; and
      the first converter element has a length $L_1$ measured along a longitudinal direction of the first converter element which is different from the length $L_2$ measured along a longitudinal direction of the second converter element, wherein:
         the upper side of the first converter element has a width $w_1$ measured perpendicular to the longitudinal direction of the first converter element, which is different from a width $w_2$ of the upper side of the second converter element measured perpendicular to the longitudinal direction of the second converter element.

9. The polarization converter according to claim 8, wherein at least one of the first and the second converter element has a trapezoidal cross-section.

10. The polarization converter according to claim 8, wherein the first and the second converter element is a semiconductor component.

11. The polarization converter according to claim 10, wherein the first and the second converter element each include at least one semiconductor layer arranged on a substrate, wherein an upper side of the respective substrate defines the respective base side of the converter element.

12. The polarization converter according to claim 8, wherein the widths $w_1$, $w_2$ are chosen such that in each of the first and the second converter element, a mode ($\vec{e}_{00}$) propagates whose polarization plane forms an angle different from 45° with the respective base side of the converter element.

13. The polarization converter according to claim 8, wherein the widths $w_1$, $w_2$ are chosen such that the angles formed by polarization planes of the modes propagating in the first converter element with the base side of the first converter element are different from the angles formed by the polarization planes of modes propagating in the second converter element with the base side of the second converter element.

14. The polarization converter according to claim 8, wherein the lengths $L_1$ and $L_2$ are not integer multiples of each other.

15. A method for producing a polarization converter, comprising the following steps:
   producing a first converter element which has a base side, an upper side extending parallel to the base side, a first longitudinal side oriented perpendicular to the base side and the upper side and a second longitudinal side, wherein the second longitudinal side is a flat side oriented obliquely at an angle $\varepsilon_1$ to the base side;
   producing a second converter element which has a base side, an upper side extending parallel to the base side, a first longitudinal side oriented perpendicular to the base side and the upper side and a second longitudinal side, wherein the second longitudinal side is a flat side oriented obliquely at an angle $\varepsilon_2$ to the base; and
   arranging the first and the second converter element in series in such a way that outward-pointing normal vectors of the first longitudinal sides of the first and the second converter element point in opposite directions, wherein:
      the first converter element has a length $L_1$ measured along a longitudinal direction of the first converter element and its upper side has a width $w_1$ measured perpendicular to the longitudinal direction of the first converter element;
      the second converter element has a length $L_2$ measured along a longitudinal direction of the second converter element and its upper side has a width $w_2$ measured perpendicular to the longitudinal direction of the second converter element, and
      the steps of producing the first and the second converter element comprise determining lengths $L_1$ and $L_2$ different from one another, and at least one of:
         determining widths $w_1$ and $w_2$ different from one another, and
         determining angles $\varepsilon_1$ and $\varepsilon_2$ different from one another, such that after passing through the first and the second converter element in a propagation direction parallel to the first and second longitudinal sides of the first and second converter element, a light wave polarized initially parallel to the base sides of the converter elements is polarized perpendicular to the base sides of the converter elements.

16. A polarization converter, comprising:
   a first converter element which has a base side, an upper side extending parallel to the base side, a first longitudinal side oriented perpendicular to the base side and the upper side and a second longitudinal side, wherein the second longitudinal side is a flat side oriented obliquely at an angle $\varepsilon_1$ to the base side; and
   a second converter element which likewise has a base side, an upper side extending parallel to the base side, a first longitudinal side oriented perpendicular to the base side and the upper side and a second longitudinal side, wherein the second longitudinal side is a flat side oriented obliquely at an angle $\varepsilon_2$ to the base side, wherein:
      the first and the second converter element are arranged in series such that outward-pointing normal vectors of the first longitudinal sides of the first and the second converter element point in opposite directions; and
      the first converter element has a length $L_1$ measured along a longitudinal direction of the first converter element which is different from the length $L_2$ measured along a longitudinal direction of the second converter element, wherein at least one of:
         the upper side of the first converter element has a width $w_1$ measured perpendicular to the longitudinal direction of the first converter element, which is different from a width $w_2$ of the upper side of the second converter element measured perpendicular to the longitudinal direction of the second converter element, and
         the angles $\varepsilon_1$ and $\varepsilon_2$ are different from one another.

\* \* \* \* \*